(12) United States Patent
Leijonberger et al.

(10) Patent No.: US 12,189,394 B2
(45) Date of Patent: Jan. 7, 2025

(54) METHOD OF ASSISTING A USER OF A ROBOTIC TOOL SYSTEM, ROBOTIC TOOL, AND ROBOTIC TOOL SYSTEM

(71) Applicant: HUSQVARNA AB, Huskvarna (SE)

(72) Inventors: Susanne Leijonberger, Jönköping (SE); Anders Sjögren, Forserum (SE); Fredrik Klackensjö, Forserum (SE); Mari Ejdehag, Habo (SE)

(73) Assignee: HUSQVARNA AB, Huskvarna (SE)

( * ) Notice: Subject to any disclaimer, the term of this patent is extended or adjusted under 35 U.S.C. 154(b) by 286 days.

(21) Appl. No.: 17/837,319

(22) Filed: Jun. 10, 2022

(65) Prior Publication Data

US 2022/0397907 A1    Dec. 15, 2022

(30) Foreign Application Priority Data

Jun. 11, 2021   (SE) .................................. 2150750-4

(51) Int. Cl.
| | | |
|---|---|---|
| *G05D 1/00* | (2024.01) | |
| *A01D 34/00* | (2006.01) | |
| *B60L 53/36* | (2019.01) | |
| *A01D 101/00* | (2006.01) | |

(52) U.S. Cl.
CPC ......... *G05D 1/0225* (2013.01); *A01D 34/008* (2013.01); *A01D 2101/00* (2013.01); *B60L 53/36* (2019.02)

(58) Field of Classification Search
CPC . A01D 34/008; A01D 2101/00; A47L 9/2873; A47L 2201/02; B60L 53/00; B60L 53/36; G05D 1/0016; G05D 1/0225; G05D 1/247; G05D 1/43; G05D 1/646; G05D 1/661; G05D 2109/10; G05D 2111/10;
(Continued)

(56) References Cited

U.S. PATENT DOCUMENTS

| | | | |
|---|---|---|---|
| 2019/0216014 A1 | 7/2019 | Hahn et al. | |
| 2019/0346848 A1* | 11/2019 | Zhou | .................... G05D 1/0088 |

(Continued)

FOREIGN PATENT DOCUMENTS

| | | | | |
|---|---|---|---|---|
| CN | 109782770 A | | 5/2019 | |
| CN | 110794840 A | | 2/2020 | |
| CN | 111007856 A | * | 4/2020 | ........... G05D 1/0225 |

(Continued)

OTHER PUBLICATIONS

Office Action and Search Report for Swedish Application No. 2150750-4 mailed on Feb. 22, 2022.

*Primary Examiner* — Charles J Han
(74) *Attorney, Agent, or Firm* — Burr & Forman LLP

(57) ABSTRACT

A method (100) of assisting a user of a robotic tool system (10) is disclosed. The robotic tool system (10) comprises a self-propelled robotic tool (1) configured to operate an area in an autonomous manner and a docking station (3) for charging one or more batteries (5) of the robotic tool (1). The method (100) comprises the steps of obtaining (110) inclination data representative of an inclination angle (a0, a1, a2) of the robotic tool (1) when the robotic tool (1) is located on or at the docking station (3) and outputting (120) a notification (n0, n1, n2) based on the inclination data. The present disclosure further relates to a robotic tool (1) and a robotic tool system (10) comprising a robotic tool (1) and a docking station (3).

16 Claims, 2 Drawing Sheets

(58) Field of Classification Search
CPC ............ G05D 2111/30; G05D 2111/40; G05D 2111/50
See application file for complete search history.

(56) References Cited

U.S. PATENT DOCUMENTS

2019/0369620 A1    12/2019   Zhou et al.
2020/0021122 A1    1/2020    Lydon et al.

FOREIGN PATENT DOCUMENTS

| | | | | |
|---|---|---|---|---|
| CN | 111070205 | A | 4/2020 | |
| EP | 3316443 | A1 | 5/2018 | |
| KR | 20180016935 | A | 2/2018 | |
| WO | WO-2020093970 | A1 * | 5/2020 | ............ A01D 34/00 |
| WO | 2020171317 | A1 | 8/2020 | |

* cited by examiner

METHOD OF ASSISTING A USER OF A ROBOTIC TOOL SYSTEM, ROBOTIC TOOL, AND ROBOTIC TOOL SYSTEM

TECHNICAL FIELD

The present disclosure relates to a method of assisting a user of a robotic tool system. The present disclosure further relates to a self-propelled robotic tool configured to operate an area in an autonomous manner, a robotic tool system comprising a self-propelled robotic tool and a docking station, as well as a computer program and a computer-readable medium.

BACKGROUND

Self-propelled robotic tools, such as self-propelled autonomous robotic lawnmowers, have become increasingly popular, partly because they usually are capable of performing work which previously was made manually. A self-propelled robotic tool is capable of navigating in an area in an autonomous manner, i.e. without the intervention or the direct control of a user. The robotic tool may move in a systematic and/or random pattern to ensure that the area is completely covered. Some robotic tools require a user to set up a border wire around an area that defines the area to be operated by the robotic tool. Such robotic tools use a sensor to locate the wire and thereby the boundary of the area to be operated.

As an alternative, or in addition, robotic tools may comprise other types of positioning units and sensors, for example sensors for detecting an event, such as a collision with an object within the area and/or a satellite-based positioning unit. A satellite-based positioning unit typically utilize a space based satellite navigation system, such as a Global Positioning System (GPS), The Russian GLObal NAvigation Satellite System (GLONASS), European Union Galileo positioning system, Chinese Compass navigation system, or Indian Regional Navigational Satellite System to provide a current position estimate of the robotic tool. Generally, robotic tools operate unattended within the area in which they operate. Examples of such areas are lawns, gardens, parks, sports fields, golf courts and the like.

Usually, a robotic tool comprises a control arrangement configured to navigate the robotic tool based on input from one or more of the above mentioned types of positioning units and sensors. Moreover, a robotic tool usually comprises one or more batteries configured to supply electricity to one or more electric propulsion motors of the robotic tool and/or one or more electrically driven tools, such as one or more cutting units.

After a certain operation time, the one or more batteries of the robotic tool must be recharged. This is normally done in a docking station. Typically, the control arrangement of the robotic tool navigates the robotic tool to the docking station when the one or more batteries is to be recharged, such as when the state of charge (SOC) level of the batteries is below a threshold state of charge. In some cases, the robotic tool uses a wire to locate the docking station but may as an alternative, or in addition, use one or more other types of positioning units and/or sensors to locate the docking station, such as one or more of the above mentioned types.

A robotic tool is usually sold to a consumer in a kit comprising the robotic tool and a docking station adapted to charge the one or more batteries of the robotic tool. Such a kit can also be referred to as a robotic tool system. The docking station usually comprises a charging unit provided with a number of electrical contacts and the robotic tool normally comprises a number of electrical conductors configured to abut against the electrical contacts of the docking station to receive electricity therefrom to charge the one or more batteries of the robotic tool. Thus, when reaching the docking station, the robotic tool is to perform a docking procedure in which the robotic tool is operated to a position in which electrical contact is obtained between the electrical conductors of the robotic tool and the electrical contacts of the docking station.

These types of docking procedures can be challenging to perform, and studies and consumer reports have shown that failed docking attempts are common. Failed docking attempts lead to an inability to charge the one or more batteries of the robotic tool and consequently interrupts autonomous operation of the robotic tool system. Obviously, this may annoy a user of a robotic tool system because the robotic tool will not be able to perform its task, such as cutting grass. Moreover, generally, on today's consumer market, it is an advantage if products, such as robotic tools and associated components, systems, and arrangements, are operational reliable, are user-friendly, and have conditions and/or characteristics suitable for being manufactured in a cost-efficient manner.

SUMMARY

It is an object of the present invention to overcome, or at least alleviate, at least some of the above-mentioned problems and drawbacks.

According to a first aspect of the invention, the object is achieved by a method of assisting a user of a robotic tool system, the robotic tool system comprising a self-propelled robotic tool configured to operate an area in an autonomous manner and a docking station for charging one or more batteries of the robotic tool. The method comprises the steps of:

obtaining inclination data representative of an inclination angle of the robotic tool when the robotic tool is located on or at the docking station, and outputting a notification based on the inclination data.

Since the method comprises the steps of obtaining inclination data and outputting a notification based on the data, a method is provided having conditions for assisting the user to improve the ability of the robotic tool to perform successful docking attempts in the docking station.

Field studies have shown that incorrect inclination angles of the docking station, as well as unfavourable properties of a ground surface in front of the docking station, are common causes of failed docking attempts of robotic tools. Unfavourable properties of the ground surface in front of the docking station may for example include inclination angle of the ground surface as well as pits and bumps in the ground surface.

The inclination angle of the robotic tool when being positioned on the docking station can indicate whether there is an incorrect inclination angle of the docking station. Moreover, the inclination angle of the robotic tool when being positioned at the docking station, i.e. positioned in a region adjacent to the docking station, can indicate whether there are unfavourable properties of a ground surface in front of the docking station. Thus, by the output of the notification based on the inclination data, the user can be notified to correct/adjust the installation of the docking station. The user can be instructed to correct/adjust the installation of the docking station for example by moving the docking station, levelling the ground surface on which the docking station is positioned, and/or levelling the ground surface in front of the docking station. In this manner, the ability of the robotic tool to perform successful docking attempts in the docking station can be improved. Accordingly, a method is provided capable of improving reliability of the robotic tool system, i.e. the ability to perform uninterrupted autonomous operation of an area.

In addition, the method has conditions for providing a more user-friendly robotic tool system because the user can obtain confirmation from the outputted notification whether an installation of the docking station is correctly performed or not.

Accordingly, a method is provided overcoming, or at least alleviating, at least some of the above-mentioned problems and drawbacks. As a result, the above-mentioned object is achieved.

The wording "ground surface in front of the docking station" as used herein means the ground surface adjacent to the docking station at a location/side of the docking station at which a robotic tool is configured to enter and/or leave the docking station during autonomous operation.

Optionally, the step of outputting the notification comprises the step of:
   outputting a notification if the inclination data indicates that the inclination angle of the robotic tool exceeds a threshold inclination angle.

Thereby, a method is provided having conditions for assisting the user to improve the ability of the robotic tool to perform successful docking attempts in the docking station in a reliable and efficient manner. This is because the inclination angle of the robotic tool when being positioned on or at the docking station is indicative of whether there is an incorrect inclination angle of the docking station and/or unfavourable properties of a ground surface in front of the docking station. Thus, by the output of a notification if the inclination data indicates that the inclination angle of the robotic tool exceeds a threshold inclination angle, the user can get notified to correct/adjust the installation of the docking station to improve the ability of the robotic tool to perform successful docking attempts in the docking station.

Optionally, the step of obtaining the inclination data comprises the step of:
   obtaining the inclination data during movement of the robotic tool onto the docking station.

Thereby, a method is provided having conditions for assisting the user to improve the ability of the robotic tool to perform successful docking attempts in the docking station in a reliable and efficient manner. This is because the inclination angle of the robotic tool during movement of the robotic tool onto the docking station is indicative of whether there are unfavourable properties of a ground surface in front of the docking station. Thus, by outputting the notification based on the inclination data, the user can be notified to correct/adjust the installation of the docking station for example by moving the docking station and/or levelling the ground surface in front of the docking station. In this manner, the ability of the robotic tool to perform successful docking attempts in the docking station can be improved and a method is provided capable of improving reliability and user-friendliness of the robotic tool system.

Optionally, the step of outputting the notification comprises the step of:
   outputting a first type of notification if the inclination data indicates that the inclination angle of the robotic tool exceeds a threshold inclination angle when the robotic tool is located on the docking station, and
   outputting a second type of notification, distinguishable from the first type of notification, if the inclination data indicates that the inclination angle of the robotic tool exceeds a threshold inclination angle during movement of the robotic tool onto the docking station.

Thereby, a further efficient method is provided for assisting a user to improve the ability of the robotic tool to perform successful docking attempts. This is because the first type of notification can notify the user whether the inclination angle of the docking station is within a correct range and the second type of notification can notify the user whether there are unfavourable properties of a ground surface in front of the docking station.

Thus, by outputting the first type of notification the user can be notified to correct/adjust the installation angle of the docking station and by outputting the second type of notification the user can be notified to correct/adjust the ground in front of the docking station. In this manner, the ability of the robotic tool to perform successful docking attempts in the docking station can be improved and a method is provided capable of improving reliability and user-friendliness of the robotic tool system.

Optionally, the method comprises the steps of:
   obtaining current inclination data representative of a current inclination angle of the robotic tool,
   comparing the current inclination data with historic inclination data representative of one or more historic inclination angle/angles of the robotic tool, and
   outputting a notification based on the difference between the current inclination angle of the robotic tool and the one or more historic inclination angle/angles of the robotic tool.

Thereby, a further improved method is provided for assisting a user to improve the ability of the robotic tool to perform successful docking attempts. This is because according to these embodiments, the method comprises the step of comparing the current inclination data with historic inclination data which is indicative of whether the installation angle of the docking station and/or the properties of the ground in front of the docking station has changed over time.

That is, field studies have shown that the installation angle of the docking station as well as the properties of the ground in front of the docking station can change over time which can cause an inability of the robotic tool to successfully dock the docking station. Moreover, field studies have shown that a particular problem is that pits may be formed in the ground in front of the docking station over time due to slipping of drive wheels of the robotic tool.

Thus, by outputting a notification based on the difference between the current inclination angle of the robotic tool and the one or more historic inclination angle/angles of the robotic tool, a proactive measure is taken in which a user can be notified about potential future docking problems of the robotic tool. In this manner, a method is provided capable of further improving reliability and user-friendliness of the robotic tool system.

Optionally, the robotic tool system comprises one or more proximity sensors configured to obtain proximity data representative of a distance between the robotic tool and the docking station, and wherein the method comprises the step of:
   verifying that the robotic tool is positioned on or at the docking station using input from the one or more proximity sensors.

Thereby, an even more efficient and reliable method is provided for improving the reliability and the user-friendliness of the robotic tool system. This is because it can be verified that the robotic tool is positioned on or at the docking station in a simple and reliable manner. In addition, the method provides conditions for a cost-efficient robotic tool system because the method can utilize one or more proximity sensors which usually already is/are comprised in robotic tool systems for verifying that the robotic tool is positioned on or at the docking station.

Optionally, the robotic tool comprises an inclination sensor configured to sense the inclination angle of the robotic tool relative to a local gravitational field, and wherein the step of obtaining the inclination data comprises the step of:

obtaining the inclination data from the inclination sensor.

Thereby, an efficient, reliable, and accurate method is provided for improving the reliability and the user-friendliness of the robotic tool system. In addition, the method provides conditions for a cost-efficient robotic tool system because the method can utilize inclination data from the inclination sensor of the robotic tool system which usually already is comprised in a robotic tool system for sensing the inclination angle of the robotic tool relative to a local gravitational field.

Optionally, the notification comprises the inclination angle of the robotic tool. Thereby, a method is provided having conditions for further improving the user-friendliness of the robotic tool system. This is because the user can be notified about the inclination angle of the robotic tool when the robotic tool is located on or at the docking station and can correct/adjust the installation of the docking station in response thereto.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments, a computer program is provided which provides conditions for overcoming, or at least alleviating, at least some of the above-mentioned drawbacks.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments, a computer-readable medium is provided which provides conditions for overcoming, or at least alleviating, at least some of the above-mentioned drawbacks.

According to a fourth aspect of the invention, the object is achieved by a self-propelled robotic tool configured to operate an area in an autonomous manner, wherein the robotic tool comprises:

one or more batteries being chargeable via a docking station, an inclination sensor configured to provide inclination data representative of an inclination angle of the robotic tool, an output unit, and a control arrangement, and wherein the control arrangement is configured to:

verify that the robotic tool is located on or at the docking station, obtain inclination data from the inclination sensor when the robotic tool is located on or at the docking station, and cause an output of a notification via the output unit based on the inclination data.

Since the control arrangement is configured to obtain inclination data and output a notification based on the data, a robotic tool is provided having conditions for assisting the user to improve the ability of the robotic tool to perform successful docking attempts in the docking station.

That is, the inclination angle of the robotic tool when being positioned on the docking station can indicate whether there is an incorrect inclination angle of the docking station. Moreover, the inclination angle of the robotic tool when being positioned at the docking station can indicate whether there are unfavourable properties of a ground surface in front of the docking station. Thus, by the output of the notification based on the inclination data, the user can be notified to correct/adjust the installation of the docking station. The user can be instructed to correct/adjust the installation of the docking station for example by moving the docking station, levelling the ground surface on which the docking station is positioned, and/or levelling the ground surface in front of the docking station. In this manner, the ability of the robotic tool to perform successful docking attempts in the docking station can be improved. Accordingly, a robotic tool is provided having conditions for improved reliability, i.e. ability to perform uninterrupted autonomous operation of an area.

In addition, a more user-friendly robotic tool is provided because the user can obtain confirmation from the outputted notification whether an installation of a docking station is correctly performed.

Accordingly, a robotic tool is provided overcoming, or at least alleviating, at least some of the above-mentioned problems and drawbacks. As a result, the above-mentioned object is achieved.

Optionally, the robotic tool comprises one or more proximity sensors configured to obtain proximity data representative of a distance between the robotic tool and the docking station, and wherein the control arrangement is configured to verify that the robotic tool is located on or at the docking station using input from the proximity sensors. Thereby, an even more efficient and reliable robotic tool is provided. This is because the control arrangement can verify that the robotic tool is positioned on or at the docking station in a simple, accurate and reliable manner. In addition, conditions are provided for a cost-efficient robotic tool because one or more proximity sensors which usually already is/are comprised in a robotic tool can be utilized to verify that the robotic tool is positioned on or at the docking station.

Optionally, the one or more proximity sensors is/are configured to sense a magnetic field generated by the docking station. Thereby, an even more efficient and reliable robotic tool is provided. This is because the control arrangement can verify that the robotic tool is positioned on or at the docking station in a simple, accurate and reliable manner. In addition, conditions are provided for a cost-efficient robotic tool because one or more proximity sensors which usually already is/are comprised in a robotic tool can be utilized to verify that the robotic tool is positioned on or at the docking station.

Optionally, the robotic tool is a self-propelled robotic lawnmower. Thereby, robotic lawnmower is provided having conditions for assisting the user to improve the ability of the robotic lawnmower to perform successful docking attempts in the docking station. Accordingly, a robotic lawnmower is provided having conditions for improved reliability, i.e. ability to perform uninterrupted autonomous operation of an area. In addition, a more user-friendly robotic lawnmower is provided because the user can obtain confirmation from the outputted notification whether an installation of a docking station is correctly performed.

According to a fifth aspect of the invention, the object is achieved by a robotic tool system comprising a self-propelled robotic tool and a docking station configured to charge one or more batteries of the robotic tool, wherein the robotic tool is configured to operate an area in an autonomous manner and comprises an inclination sensor configured to provide inclination data representative of an inclination angle of the robotic tool, and wherein the robotic tool system comprises an output unit and a control arrangement, the control arrangement being configured to:

verify that the robotic tool is located on or at the docking station, obtain inclination data from the inclination sensor when the robotic tool is located on or at the docking station, and cause an output of a notification via the output unit based on the inclination data.

Since the control arrangement is configured to obtain inclination data and output a notification based on the data, a robotic tool system is provided having conditions for assisting the user to improve the ability of the robotic tool to perform successful docking attempts in the docking station.

That is, the inclination angle of the robotic tool when being positioned on the docking station can indicate whether there is an incorrect inclination angle of the docking station. Moreover, the inclination angle of the robotic tool when being positioned at the docking station can indicate whether there are unfavourable properties of a ground surface in front of the docking station. Thus, by the output of the notification based on the inclination data, the user can be notified to correct/adjust the installation of the docking station. The user can be instructed to correct/adjust the installation of the docking station for example by moving the docking station, levelling the ground surface on which the docking station is positioned, and/or levelling the ground surface in front of the docking station. In this manner, the ability of the robotic tool to perform successful docking attempts in the docking station can be improved. Accordingly, a robotic tool system is provided having conditions for improved reliability, i.e. ability to perform uninterrupted autonomous operation of an area.

In addition, a more user-friendly robotic tool system is provided because the user can obtain confirmation from the outputted notification whether an installation of a docking station is correctly performed.

Accordingly, a robotic tool system is provided overcoming, or at least alleviating, at least some of the above-mentioned problems and drawbacks. As a result, the above-mentioned object is achieved.

Optionally, the docking station comprises one or more magnetic field generating units configured to generate a magnetic field, and wherein the robotic tool comprises one or more proximity sensors configured to sense a magnetic field, and wherein the control arrangement is configured to verify that the robotic tool is located on or at the docking station using input from the one or more proximity sensors. Thereby, an even more efficient and reliable robotic tool system is provided. This is because the control arrangement can verify that the robotic tool is positioned on or at the docking station in a simple, accurate and reliable manner. In addition, conditions are provided for a cost-efficient robotic tool system because one or more proximity sensors which usually already is/are comprised in a robotic tool system can be utilized to verify that the robotic tool is positioned on or at the docking station.

Optionally, the output unit is a wireless communication unit configured to output the notification to an external device. Thereby, an even more efficient, reliable, and user-friendly robotic tool system is provided. This is because a user can obtain a notification at a location distant from the robotic tool system indicating the status of the installation of the docking station. In this manner, the user can be notified of whether the docking station is correctly installed and/or whether a correction/adjustment of the installation of the docking station is needed at a location distant from the robotic tool system.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
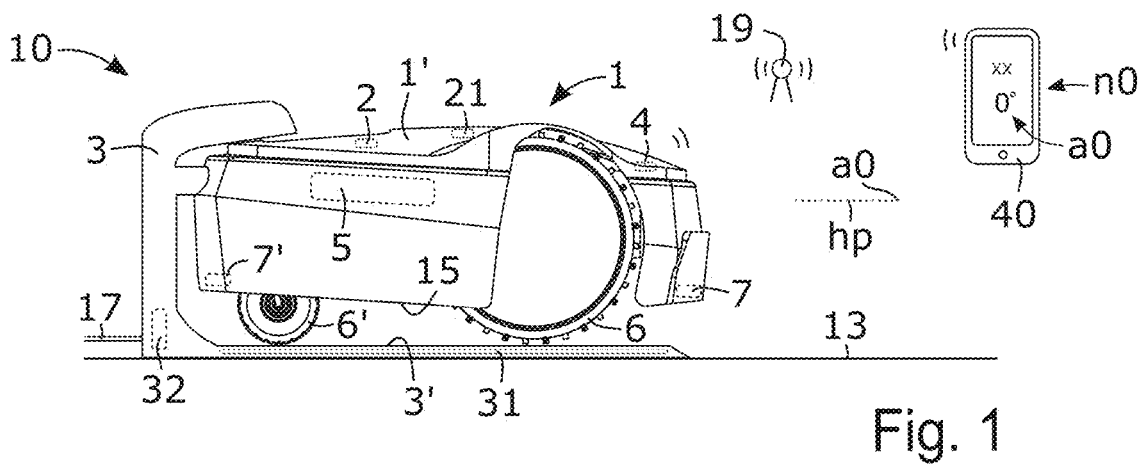
FIG. 1 illustrates a robotic tool system according to some embodiments.

FIG. 1 illustrates a robotic tool system 10 according to some embodiments. The robotic tool system 10 comprises a self-propelled robotic tool 1 and a docking station 3 configured to charge one or more batteries 5 of the self-propelled robotic tool 1. According to the illustrated embodiments, the self-propelled robotic tool 1 of the robotic tool system 10 is a self-propelled robotic lawnmower, i.e. a lawnmower capable of cutting grass in an area in an autonomous manner without the intervention or the direct control of a user. According to the illustrated embodiments, the self-propelled robotic lawnmower is configured to be used to cut grass in areas used for aesthetic and recreational purposes, such as gardens, parks, city parks, sports fields, lawns around houses, apartments, commercial buildings, offices, and the like.

According to further embodiments the self-propelled robotic tool 1 may be another type of robotic tool than a robotic lawnmower. For the reason of brevity and clarity, the self-propelled robotic tool 1 is in some places herein referred to as "the robotic tool 1".

The robotic tool 1 comprises a tool chassis 1' and a number of support members 6, 6' each configured to abut against a ground surface 13 in during operation of the robotic tool 1. According to the illustrated embodiments, the tool support members 6, 6' is wheels 6, 6' of the robotic tool 1. According to further embodiments, the robotic tool 1 may comprise one or more other types of tool support members 6, 6', such as one or more continuous track arrangements, one or more ground engaging protrusions, or the like. According to the illustrated embodiments, the robotic tool 1 comprises three wheels 6, 6', namely two drive wheels 6 and one support wheel 6'. In FIG. 1, one of the drive wheels is hidden behind the other drive wheel 6. The drive wheels 6 of the robotic tool 1 may each be powered by an electrical motor of the robotic tool 1 to provide motive power and/or steering of the robotic tool 1. Steering of the robotic tool 1 may be provided by rotating the drive wheels 6 at different rotational speeds.

According to the illustrated embodiments, the drive wheels 6 of the robotic tool 1 are non-steered wheels having a fix rolling direction in relation to the tool chassis 1'. The respective rolling direction of the drive wheels 6 of the robotic tool 1 is substantially parallel to a longitudinal direction of the robotic tool 1. According to the illustrated embodiments, the support wheel 6' is a non-driven wheel. Moreover, according to the illustrated embodiments, the support wheel 6' can pivot around a pivot axis such that the rolling direction of the support wheel 6' can follow a travel/moving direction of the robotic tool 1.

As understood from the above, when the drive wheels 6 of the robotic tool 1 are rotated at the same rotational velocity in a forward rotational direction, and no wheel slip is occurring, the robotic tool 1 will move in a forward moving direction. Likewise, when the drive wheels 6 of the robotic tool 1 are rotated at the same rotational velocity in a reverse rotational direction, and no wheel slip is occurring, the robotic tool 1 will move in a reverse moving direction.

According to the illustrated embodiments, the robotic tool 1 may be referred to as a three-wheeled front wheel driven robotic tool 1. According to further embodiments, the robotic tool 1 may be provided with another number of wheels 6, 6' such as four wheels. Moreover, according to further embodiments, the robotic tool 1 may be provided with another configuration of driven and non-driven wheels, such as a rear wheel drive or an all-wheel drive.

According to the illustrated embodiments, the robotic tool 1 comprises a control arrangement 21. The control arrangement 21 may be configured to control propulsion of the robotic tool 1, and steer the robotic tool 1, by controlling electrical motors of the robotic tool 1 arranged to drive the drive wheels 6 of the robotic tool 1. According to further embodiments, the control arrangement 21 may be configured to steer the robotic tool 1 by controlling the angle of steered wheels of the robotic tool 1. According to still further embodiments, the robotic tool 1 may be an articulated robotic tool, wherein the control arrangement 21 may be configured to steer the robotic tool by controlling the angle between frame portions of the articulated robotic tool.

The control arrangement 21 may be configured to control propulsion of the robotic tool 1, and steer the robotic tool 1, so as to navigate the robotic tool 1 in an area to be operated. Moreover, according to some embodiments the control arrangement 21 is configured to navigate the robotic tool 1 to a location on or at the docking station 3. According to the illustrated embodiments, the robotic tool 1 comprises a number of sensors 7, 7' configured to sense a magnetic field of a boundary wire. The control arrangement 21 is operably connected to the number of sensors 7, 7' and uses the sensors 7, 7' to locate a wire which generates a magnetic field. In this manner the control arrangement 21 can locate the boundary of the area to be operated. The sensors 7, 7' may also be referred to as proximity sensors 7, 7'. In FIG. 1, a first sensor 7 and a second sensor 7' of the robotic tool 1 are indicated. The first sensor 7 is arranged at a front section of the robotic tool 1 and the second sensor 7' is arranged at a rear section of the robotic tool 1 as is further explained herein. The first sensor 7 may also be referred to as a first proximity sensors 7 and the second sensor 7' may also be referred to as a second proximity sensor 7'.

As an alternative to the sensors 7, 7', or in addition to the sensors 7, 7', the robotic tool 1 may comprise one or more other types of sensors, proximity sensors, and/or positioning units for obtaining proximity data representative of a distance between the robotic tool 1 and the docking station 3. As an example, the robotic tool 1 may comprise one or more sensors arranged to detect an impending or ongoing collision event with an object. The one or more positioning units may comprise a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System. As an alternative, or in addition, the control arrangement 21 may be configured to obtain data from, or may comprise, one or more positioning units utilizing a local reference source, such as a local sender and/or a wire, to estimate or verify a current position of the robotic lawnmower 1. As another example, the robotic tool 1 may comprise one or more of a Radio Detection and Ranging (radar) sensor, a Light Detection and Ranging (lidar) sensor, an image capturing unit, such as a camera, an ultrasound sensor, or the like, for obtaining proximity data representative of a distance between the robotic tool 1 and the docking station 3.

The control arrangement 21 may be configured to control propulsion of the robotic tool 1, and steer the robotic tool 1, so as to navigate the robotic tool 1 in a systematic and/or random pattern to ensure that an area is completely covered, using input from one or more of the above described sensors and/or units.

According to the illustrated embodiments, the robotic tool 1 comprises a cutting unit 15. The cutting unit 15 is configured to cut grass during operation of the robotic tool 1. Moreover, according to the illustrated embodiments, the robotic tool 1 comprises an electric motor configured to power the cutting unit 15. The electric motor is not indicated in FIG. 1 for reasons of brevity and clarity. The robotic tool 1 may comprise more than one cutting unit 15 and more than one electric motor for powering a cutting unit of the robotic tool 1.

The robotic tool 1 further comprises a battery 5. The robotic tool 1 may comprise more that one battery 5. Therefore, the battery 5 indicated in FIG. 1 is in some places herein referred to as the one or more batteries 5. The one or more batteries 5 of the robotic tool 1 is configured to supply electricity to electrical components of the robotic tool 1 during operation of the robotic tool 1, such as to one or more propulsion motors, one or more electric motors for powering a cutting unit 15, the control arrangement 21, and the like.

The one or more batteries 5 is/are chargeable via the docking station 3. In FIG. 1, the robotic tool 1 is illustrated as positioned in the docking station 3. According to the illustrated embodiments, the docking station 3 comprises a docking station plate 3' wherein the each of the support members 6, 6' of the robotic tool 1 abut against the docking station plate 3'. Therefore, in FIG. 1, the robotic tool 1 can be said to be illustrated as positioned on the docking station 3. As is further explained with reference to FIG. 3 below, the docking station 3 comprises a number of electrical contacts and the robotic tool 1 comprises a number of electrical conductors configured to abut against the electrical contacts of the docking station 3 to receive electricity therefrom to charge the one or more batteries 5 of the robotic tool 1. The docking station 3 comprises a cable 17 for connection to an external electric power source, such as an electric power grid. In FIG. 1, the robotic tool 1 is illustrated in a position relative to the docking station 3 in which the electrical conductors of the robotic tool 1 are abutting against the electrical contacts of the docking station 3. This position of the robotic tool 1 relative to the docking station 3 may also be referred to as a docked position or a fully docked position.

The robotic tool 1 comprises an inclination sensor 2. The inclination sensor 2 may also be referred to as an inclination angle sensor and is configured to provide inclination data representative of an inclination angle a0 of the robotic tool 1 relative to a local gravitational field. The inclination sensor 2 may comprise an accelerometer and/or a gyroscope. The inclination sensor 2 may be configured to sense the orientation of the robotic tool 1 relative a horizontal plane hp at the location of the robotic tool 1. In FIG. 1, the robotic tool 1 is illustrated such that the robotic tool 1 is aligned with the horizontal plane hp meaning that ground engaging portions of the support members 6, 6' of the robotic tool 1 extend in a plane parallel to the horizontal plane hp.

The aspect that the robotic tool 1 is aligned with the horizontal plane hp may also be expressed as that each of a lateral and longitudinal axis of the robotic tool 1 is parallel to the horizontal plane hp. The inclination angle a0 of the robotic tool 1, as referred to herein, may also be referred to as an inclination angle a0 of the tool chassis 1' of the robotic tool 1 relative to a horizontal plane hp at the location of the robotic tool 1, wherein the inclination angle a0 of the tool chassis 1' may be defined as the angle between to horizontal plane hp and a longitudinal axis of the tool chassis 1' and/or the angle between to horizontal plane hp and a lateral axis of the tool chassis 1'.

Figure 3:
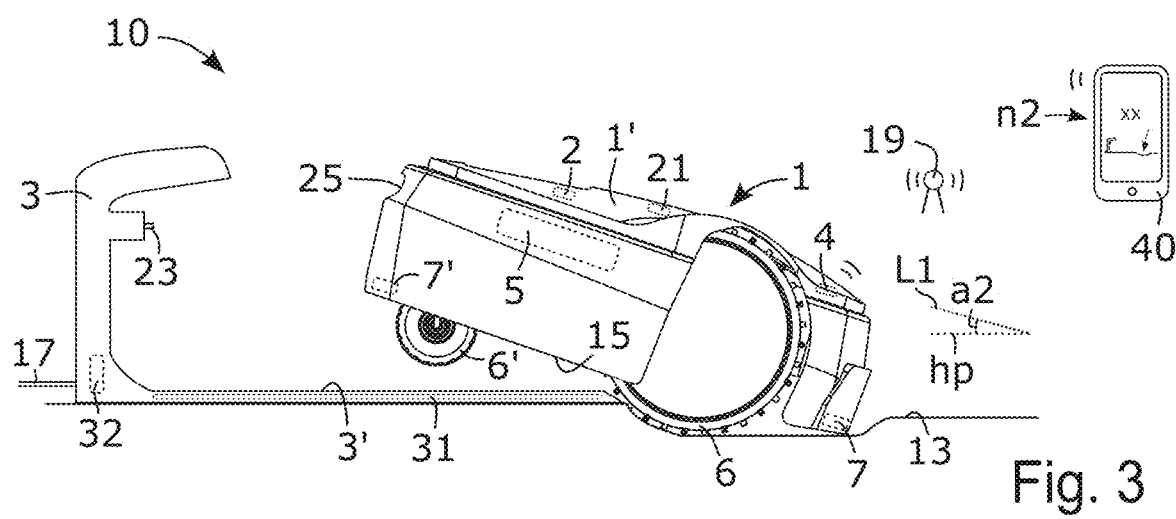
FIG. 3 illustrates the robotic tool system illustrated in FIG. 1 and FIG. 2 in which the robotic tool 1 is illustrated in a non-docked position at the docking station.

Since the robotic tool 1 is aligned with the horizontal plane hp and is located on the docking station 3 in FIG. 3, the docking station 3 is also aligned with the horizontal plane hp meaning that ground engaging portions or surfaces of the docking station 3 extend in a plane parallel to the horizontal plane hp. The aspect that the docking station 3 is aligned with the horizontal plane hp may also be expressed as that the docking station plate 3' of the docking station 3 is parallel to the horizontal plane hp.

According to the illustrated embodiments, the robotic tool 1 of the robotic tool system 10 comprises an output unit 4 connected to the control arrangement 21. According to the illustrated embodiments, the output unit 4 is a wireless communication unit capable of outputting notifications n0 to an external device 40. The communication may be performed wirelessly over a wireless connection such as the internet, or a wireless local area network (WLAN), a cellular network, or a wireless connection for exchanging data over short distances using short-wavelength, i.e. ultra-high frequency (UHF) radio waves in the industrial, scientific, and medical (ISM) band from 2.4 to 2.485 GHz. The communication may be performed directly or via an intermediate unit 19 or system.

The output unit 4 may form part of a communication unit connected to the control arrangement 21, wherein the communication unit may be configured to communicate with a remote communication unit to receive instructions therefrom and/or to send information thereto. As an alternative, or in addition, the docking station 3 of the robotic tool system 10 may comprise one or more output units, as is further explained herein.

According to embodiments herein, the control arrangement 21 is configured to verify that the robotic tool 1 is located on or at the docking station 3. According to the illustrated embodiments, the control arrangement 21 is configured to verify that the robotic tool 1 is located on or at the docking station 3 using input from the one or more proximity sensors 7, 7'. That is, as can be seen in FIG. 1, according to the illustrated embodiments, the docking station 3 comprises two magnetic field generating units 31, 32 each configured to generate a magnetic field. The two magnetic field generating units 31, 32 are arranged at different positions on the docking station 3. In more detail, the docking station 3 according to the illustrated embodiments comprises a first magnetic field generating unit 31 arranged in the docking station plate 3' and a second magnetic field generating unit 31 arranged in a stem of the docking station 3.

According to further embodiments, the docking station 3 may comprise another number of magnetic field generating units 31, 32 which may be arranged at different positions on the docking station 3 than what is illustrated in FIG. 1. As understood from the herein described, the proximity sensors 7, 7' are configured to obtain proximity data representative of a distance between the robotic tool 1 and the docking station 3. Since the proximity sensors 7, 7' are configured to sense a magnetic field, the control arrangement 21 can utilize input from the proximity sensors 7, 7' to determine the position of the robotic tool 1 relative to the docking station 3 and thereby also verify that the robotic tool 1 is located on or at the docking station 3. However, as mentioned above, the robotic tool 1 may comprise one or more other types of proximity sensors than sensors configured to sense a magnetic field. As explained above, such proximity sensors may comprise one or more of a one or more of a sensor arranged to detect an impending or ongoing collision event with an object, a space based satellite navigation system, a Radio Detection and Ranging (radar) sensor, a Light Detection and Ranging (lidar) sensor, an image capturing unit, such as a camera, an ultrasound sensor, or the like, for obtaining proximity data representative of a distance between the robotic tool 1 and the docking station 3.

Moreover, according to embodiments herein, the control arrangement 21 is configured to obtain inclination data from the inclination sensor 2 when the robotic tool 1 is located on or at the docking station 3 and to cause an output of a notification n0 via the output unit 4 based on the inclination data. In this manner, a user of the robotic tool system 10 can be notified about the installation of the docking station 3, as is further explained herein.

According to the illustrated embodiments, the notification n0 is configured to be received in, and displayed by, an external unit 40. In this manner, the user can be notified about the installation of the docking station 3 even when the user is at a location remote from the docking station 3. In FIG. 1, the external unit 40 is illustrated in the form of a cell phone. However, obviously, the notification n0 can be received in, and displayed by, another type of external device, such as a computer tablet, computer, smart watch, or the like. Furthermore, as is further explained herein, the robotic tool system 10 may comprise one or more other types of output units 4.

According to the illustrated embodiments, the notification n0 comprises the inclination angle a0 of the robotic tool 1. In other words, the notification n0 comprises data representative of a value of the inclination angle a0 of the robotic tool 1 relative to the horizontal plane hp at the location of the robotic tool 1. Furthermore, as illustrated in FIG. 1, the value of the inclination angle a0 is displayed on the external device 40. In this manner, the user of the robotic tool system 10 is notified about the inclination angle a0 of the docking station 3, as is further explained herein.

Figure 2:
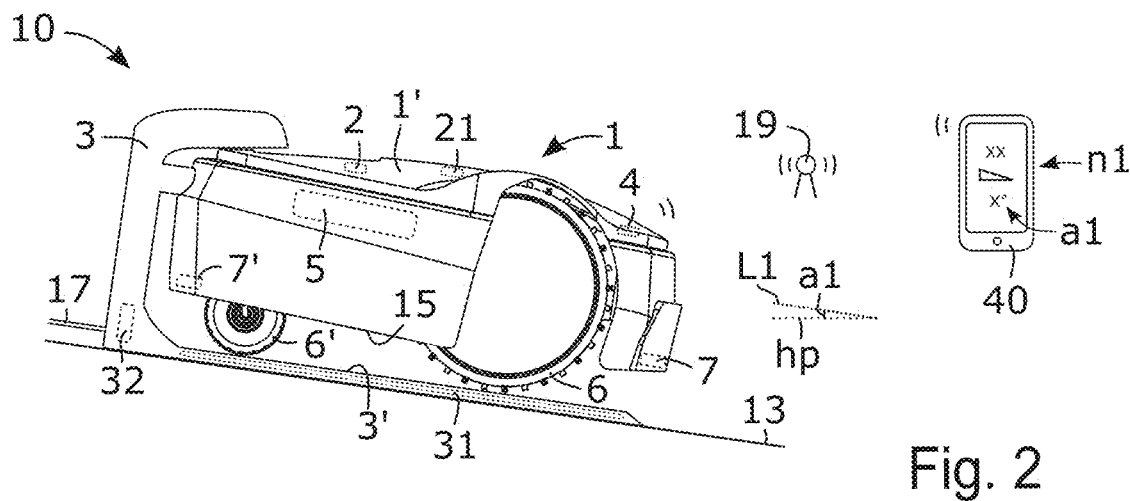
FIG. 2 illustrates the robotic tool system illustrated in FIG. 1 in which a robotic tool and a docking station of the robotic tool system are illustrated as being inclined relative to a horizontal plane.

FIG. 2 illustrates the robotic tool system 10 illustrated in FIG. 1 in which the robotic tool 1 and the docking station 3 are illustrated as being inclined relative to the horizontal plane hp. That is, the line L1 illustrated in FIG. 2 is drawn in a direction parallel to a plane extending through ground engaging portions of the support members 6, 6' of the robotic tool 1. Likewise, the line L1 illustrated in FIG. 2 is drawn in a direction parallel to a plane extending through ground engaging portions or surfaces of the docking station 3. As can be seen in FIG. 2, the robotic tool 1 has an inclination angle a1 relative to the horizontal plane hp. In the illustrated example, the inclination angle a1 is approximately 8 degrees. As understood from the herein described, in the illustrated example, the docking station 3 also has an inclination angle a1 of approximately 8 degrees because the robotic tool 1 is positioned on the docking station 3 in FIG. 2.

As indicated in FIG. 2, the value of the inclination angle a1 is displayed on the external device 40. In this manner, the user of the robotic tool system 10 is notified about the inclination angle a1 of the docking station 3 and can be instructed to correct/adjust the installation of the docking station 3 for example by moving the docking station 3, levelling the ground surface 13 on which the docking station 3 is positioned, or the like. The value of the inclination angle a1 may be displayed as a number on the external device 40. As an alternative, or in addition, the notification n1, as referred to herein may comprise one or more of a symbol, a picture, a dial, a chart, a diagram, a text, a sound, a haptic signal, or the like.

Moreover, the output unit 4, as referred to herein, may as an alternative, or in addition, to a wireless communication unit comprise another type of output unit such as a display, a speaker, a summer, a haptic arrangement, a signalling lamp, or the like. Moreover, according to some embodiments of the herein described, the output unit 4, as referred to herein, may be arranged in the docking station 3 of the robotic tool system 10. In other words, the docking station 3 may comprise the output unit 4 as referred to herein. Such an output unit may comprise of one or more of the herein described types of output units.

According to some embodiments, the control arrangement 21 is configured to obtain inclination data from inclination sensor 2 representative of the inclination angle a1 of the robotic tool 1 when the robotic tool 1 is located on or at the docking station 3 and is configured to output a notification if the inclination data indicates that the inclination angle a1 of the robotic tool 1 exceeds a threshold inclination angle. Purely as examples, the threshold inclination angle may be 5 degrees or 3 degrees. Thus, by the output of a notification n1 if the inclination data indicates that the inclination angle a1 of the robotic tool 1 exceeds a threshold inclination angle, the user can get notified to correct/adjust the installation of the docking station 3 when needed.

FIG. 3 illustrates the robotic tool system 10 illustrated in FIG. 1 and FIG. 2 in which the robotic tool 1 is illustrated in a non-docked position at the docking station 3. In FIG. 3, electrical contacts 23 of the docking station 3 and electrical conductors 25 of the robotic tool 1 are indicated. According to the illustrated embodiments, the electrical conductors 25 of the robotic tool 1 are arranged at a rear portion of the robotic tool 1. Thus, according to the illustrated embodiments, the robotic tool 1 according to the illustrated embodiments is configured to navigate in a reverse moving direction onto the docking station 3. However, according to further embodiments, the electrical conductors 25 of the robotic tool 1 may be arranged at a front portion of the robotic tool 1 and the robotic tool 1 may consequently be configured to navigate in a forward moving direction onto the docking station 3.

As explained above, in FIG. 3, the robotic tool 1 is illustrated as located at the docking station 3. The control arrangement 21 of the robotic tool 1 may identify that the robotic tool 1 is located at the docking station 3 using input from the one or more proximity sensors 7, 7' of the robotic tool 1. As indicated above, the docking station 3 according to the illustrated embodiments comprises a first magnetic field generating unit 31 arranged in the docking station plate 3' and a second magnetic field generating unit 31 arranged in a stem of the docking station 3. As can be seen when comparing FIG. 1 and FIG. 3, each of the first and second proximity sensors 7, 7' is closer to a magnetic field generating unit 31, 32 of the docking station 3 when in the docked position illustrated in FIG. 1 than when the robotic tool 1 is in the undocked position at the docking station 3 as illustrated in FIG. 3. The proximity sensors 7, 7' are configured to sense a magnetic field generated by the magnetic field generating unit 31, 32 of the docking station 3 of the docking station 3. The first and second proximity sensors 7, 7' will thus sense magnetic fields having different intensity and/or direction when the robotic tool 1 is in the position illustrated in FIG. 3 as compared to when the robotic tool 1 is in the position illustrated in FIG. 1.

Moreover, if the robotic tool 1 is at a position further from docking station 3 than what is illustrated in FIG. 3, the first and second proximity sensors 7, 7' will be unable to sense a magnetic field from the magnetic field generating units 31, 32, or will be able to sense a magnetic field having low intensity. The control arrangement 21 may thus use data from the proximity sensors 7, 7' to determine whether the robotic tool 1 is located at the docking station 3. The expression "at the docking station", as used herein, may encompass that the robotic tool 1 is located at a distance smaller than 1.5 metres, or smaller than 1 meter, from the docking station 3. Moreover, the expression "at the docking station", as used herein, may encompass that at least one part of the robotic tool 1 is touching the docking station 3, such that a part of at least one support member 6, 6' of the robotic tool 1.

In the illustrated example in FIG. 3, the docking station 3 is illustrated as aligned with the horizontal plane hp. Moreover, as clearly seen in FIG. 3, a pit is formed in the ground surface 13 adjacent to the docking station 3. Studies have shown that pits may be formed in ground surfaces 13 adjacent to docking stations over time due to slipping of drive wheels 6 of a robotic tool 1 during docking manoeuvres. Which clearly can be seen in the example illustrated in FIG. 3, pits adjacent to the docking station 3 may reduce the ability of the robotic tool 1 to perform successful docking attempts. During docking attempts in these cases, the robotic tool 1 can obtain large inclination angles a2.

According to the illustrated embodiments, the control arrangement 21 is configured to obtain inclination data from the inclination sensor 2 during movement of the robotic tool 1 onto the docking station 3. In this manner, the control arrangement 21 can determine whether there are unfavourable properties of a ground surface 13 adjacent to the docking station 3, such as bumps, pits, and the like. According to these embodiments, the control arrangement 21 may compare the inclination data obtained from the inclination sensor 2 during movement of the robotic tool 1 onto the docking station 3 with reference data and may cause the output unit 4 to output a notification n2 if the comparison indicates that there are unfavourable properties of a ground surface 13 adjacent to the docking station 3. The reference data may for example comprise a threshold inclination angle and/or historic inclination data representative of one or more historic inclination angle/angles a0, a1, a2 of the robotic tool 1.

The following is explained with simultaneous reference to FIG. 2 and FIG. 3. According to the illustrated embodiments, the control arrangement 21 is configured to cause the output unit 4 to output a first type of notification n1 if the inclination data indicates that the inclination angle a1 of the robotic tool 1 exceeds a threshold inclination angle when the robotic tool 1 is located on the docking station 3, i.e. such as when the robotic tool 1 is at a position relative to the docking station 3 illustrated in FIG. 2. Moreover, according to these embodiments, the control arrangement 21 is configured to cause the output unit 4 to output a second type of notification n2, distinguishable from the first type of notification n1, if the inclination data indicates that the inclination angle a2 of the robotic tool 1 exceeds a threshold inclination angle during movement of the robotic tool 1 onto the docking station 3, i.e. such as when the robotic tool 1 is at a position relative to the docking station 3 illustrated in FIG. 3.

In this manner, the user can separate between situations in which failed docking attempts, or potentially failed docking attempts, are caused by too great inclination angles of the docking station 3 and situations in which unfavourable properties of a ground surface 13 adjacent to the docking station 3 are causing failed docking attempts, or potentially failed docking attempts. Thus, by outputting the first type of notification n1 the user can be notified to correct/adjust the installation angle of the docking station 3 and by outputting the second type n2 of notification the user can be notified to correct/adjust the ground surface in front of the docking station 3.

According to the illustrated embodiments, the second type of notification n2 is distinguishable from the first type of notification n1 by comprising a different type of picture displayed on the external device 40. According to further embodiments, the second type of notification n2 may be distinguishable from the first type of notification n1 by comprising one or more of a different type of symbol, dial, chart, diagram, text, sound, and haptic signal than the first type of notification n1.

Below simultaneous reference is made to FIG. 1-FIG. 3, if not indicated otherwise. According to some embodiments, the control arrangement 21 is configured to obtain current inclination data representative of a current inclination angle a0, a1, a2 of the robotic tool 1 from the inclination sensor 2 and to compare the current inclination data with historic inclination data representative of one or more historic inclination angle/angles a0, a1, a2 of the robotic tool 1. According to these embodiments the control arrangement 21 may be configured to cause the output unit 4 to output a notification n0, n1, n2 based on the difference between the current inclination angle a0, a1, a2 of the robotic tool 1 and the one or more historic inclination angle/angles a0, a1, a2 of the robotic tool 1.

Due to these features, the control arrangement 21 is able to detect whether the installation angle of the docking station 3, and/or the properties of the ground surface 13 adjacent to the docking station 3, has/have changed over time. Thus, by outputting a notification n0, n1, n2 based on the difference between the current inclination angle a0, a1, a2 of the robotic tool 1 and the one or more historic inclination angle/angles a0, a1, a2 of the robotic tool 1, a proactive measure is taken in which a user can be notified about potential future docking problems of the robotic tool 1. The historic inclination data may be stored in a memory in the robotic tool 1, a memory of the control arrangement 21, a memory in the docking station 3, and/or may be sent to the robotic tool 1 or the docking station 3 for example via an intermediate unit 19 or system.

Figure 4:
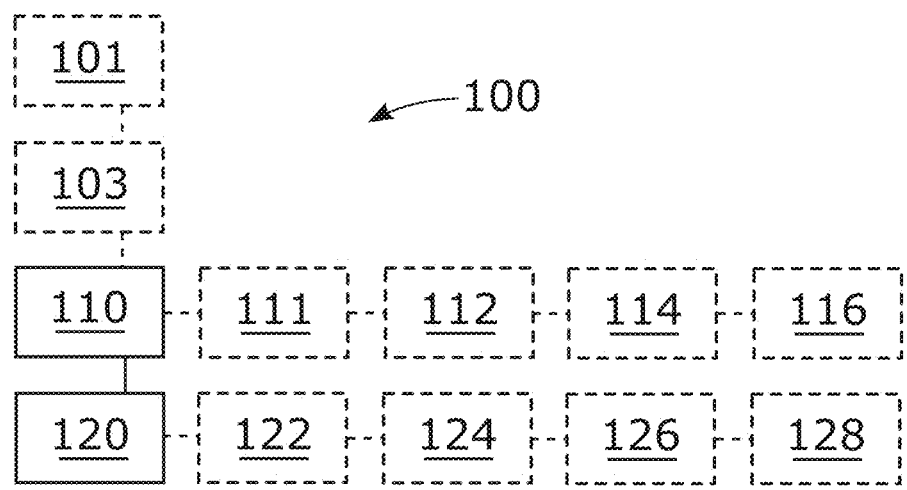
FIG. 4 illustrates a method of assisting a user of a robotic tool system.

FIG. 4 illustrates a method of assisting a user of a robotic tool system. The robotic tool system may be a robotic tool system 10 according to the embodiments explained with reference to FIG. 1-FIG. 3. Therefore, below, simultaneous reference is made to FIG. 1-FIG. 4, if not indicated otherwise. The method 100 is a method 100 of assisting a user of a robotic tool system 10, wherein the robotic tool system 10 comprises:

a self-propelled robotic tool 1 configured to operate an area in an autonomous manner, and a docking station 3 for charging one or more batteries 5 of the robotic tool 1, wherein the method 100 comprises the steps of:

obtaining 110 inclination data representative of an inclination angle a0, a1, a2 of the robotic tool 1 when the robotic tool 1 is located on or at the docking station 3, and outputting 120 a notification n0, n1, n2 based on the inclination data.

The method 100 may comprise the step of:

navigating 101 the robotic tool 1 to a location on or at the docking station 3.

The step of navigating 101 the robotic tool 1 to a location on or at the docking station 3 may be performed prior to the steps 110 and 120 referred to above As indicated in FIG. 4, the step of outputting 120 the notification n0, n1, n2 may comprise the step of:

outputting 122 a notification n0, n1, n2 if the inclination data indicates that the inclination angle a0, a1, a2 of the robotic tool 1 exceeds a threshold inclination angle.

Moreover, as indicated in FIG. 4, the step of obtaining 110 the inclination data may comprise the step of:

obtaining 112 the inclination data during movement of the robotic tool 1 onto the docking station 3.

Furthermore, as indicated in FIG. 4, the step of outputting 120, 122 the notification n0, n1, n2 comprises the step of:

outputting 124 a first type of notification n1 if the inclination data indicates that the inclination angle a1 of the robotic tool 1 exceeds a threshold inclination angle when the robotic tool 1 is located on the docking station 3, and outputting 126 a second type of notification n2, distinguishable from the first type of notification n1 if the inclination data indicates that the inclination angle a2 of the robotic tool 1 exceeds a threshold inclination angle during movement of the robotic tool 1 onto the docking station 3.

As indicated in FIG. 4, the method 100 may comprise the steps of:

obtaining 114 current inclination data representative of a current inclination angle a0, a1, a2 of the robotic tool 1, comparing 116 the current inclination data with historic inclination data representative of one or more historic inclination angle/angles a0, a1, a2 of the robotic tool 1, and outputting 128 a notification n0, n1, n2 based on the difference between the current inclination angle a0, a1, a2 of the robotic tool 1 and the one or more historic inclination angle/angles a0, a1, a2 of the robotic tool 1.

According to some embodiments, the robotic tool system 10 comprises one or more proximity sensors 7, 7' configured to obtain proximity data representative of a distance between the robotic tool 1 and the docking station 3, and wherein the method 100 comprises the step of:

verifying 103 that the robotic tool 1 is positioned on or at the docking station 3 using input from the one or more proximity sensors 7, 7'.

According to some embodiments, the robotic tool 1 comprises an inclination sensor 2 configured to sense the inclination angle a0, a1, a2 of the robotic tool 1 relative to a local gravitational field, and wherein the step of obtaining 110, 112, 114 the inclination data comprises the step of:

obtaining 111 the inclination data from the inclination sensor 2.

According to some embodiments, the notification n0, n1 comprises the inclination angle a0, a1 of the robotic tool 1.

It will be appreciated that the various embodiments described for the method 100 are all combinable with the control arrangement 21 as described herein. That is, the control arrangement 21 may be configured to perform any one of the method steps 101, 103, 110, 111, 112, 114, 116, 120, 122, 124, 126, and 128 of the method 100.

Figure 5:
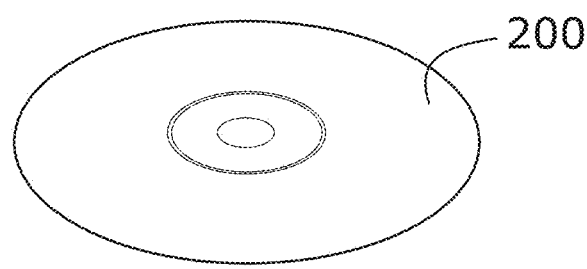
FIG. 5 illustrates computer-readable medium according to some embodiments.

FIG. 5 illustrates computer-readable medium 200 comprising instructions which, when executed by a computer, cause the computer to carry out the method 100 according to some embodiments of the present disclosure.

According to some embodiments, the computer-readable medium 200 comprises a computer program comprising instructions which, when the program is executed by a computer, cause the computer to carry out the method 100 according to some embodiments.

One skilled in the art will appreciate that the method 100 of assisting a user of a robotic tool system 10 may be implemented by programmed instructions. These programmed instructions are typically constituted by a computer program, which, when it is executed in the control arrangement 21, ensures that the control arrangement 21 carries out the desired control, such as the method steps 101, 103, 110, 111, 112, 114, 116, 120, 122, 124, 126, and 128 described herein. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the robotic tool 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the robotic tool's control system and/or the component or components for which the signals are intended. Each of the connections to the respective components of the robotic tool 1 for receiving and sending input and output signals may take the form of one or more from among a cable, a data bus, e.g. a CAN (controller area network) bus, or some other bus configuration, or a wireless connection.

In the embodiments illustrated, the robotic tool 1 comprises a control arrangement 21 but might alternatively be implemented wholly or partly in two or more control arrangements or two or more control units.

The computer program product 200 may be provided for instance in the form of a data carrier carrying computer program code for performing at least some of the method steps 101, 103, 110, 111, 112, 114, 116, 120, 122, 124, 126, and 128 according to some embodiments when being loaded into one or more calculation units of the control arrangement 21. The data carrier may be, e.g. a CD ROM disc, as is illustrated in FIG. 5, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

In the examples illustrated in FIG. 2 and FIG. 3, the robotic tool 1 is oriented relative to the horizontal plane hp in such a manner that a longitudinal axis of the tool body 1' is inclined relative to the horizontal plane hp with an inclination angle a1, a2. However, the method 100 and control arrangement 21 as described herein may also be configured to detect and notify if/when the robotic tool 1 is oriented relative to the horizontal plane hp in such a manner that a lateral axis of the tool body 1' is inclined relative to the horizontal plane hp with an inclination angle.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of assisting a user of a robotic tool system, the robotic tool system comprising:
    a self-propelled robotic tool configured to operate an area in an autonomous manner, and
    a docking station that charges one or more batteries of the robotic tool, wherein the method comprises the steps of:
    obtaining inclination data representative of an inclination angle of the robotic tool when the robotic tool is located on or at the docking station,
    outputting a notification based on the inclination data,
    obtaining current inclination data representative of a current inclination angle of the robotic tool,
    comparing the current inclination data with historic inclination data representative of one or more historic inclination angle/angles of the robotic tool, and
    outputting a notification based on a difference between the current inclination angle of the robotic tool and the one or more historic inclination angle/angles of the robotic tool.

2. The method according to claim 1, wherein the step of outputting the notification comprises the step of:
    outputting a notification responsive to the inclination data indicating that the inclination angle of the robotic tool exceeds a threshold inclination angle.

3. The method according to claim 1, wherein the step of obtaining the inclination data comprises the step of:
    obtaining the inclination data during movement of the robotic tool onto the docking station.

4. The method according to claim 1, wherein the step of outputting the notification comprises the step of:
    outputting a first type of notification responsive to the inclination data indicating that the inclination angle of the robotic tool exceeds a threshold inclination angle and the robotic tool is located on the docking station, and
    outputting a second type of notification, distinguishable from the first type of notification, responsive to the inclination data indicating that the inclination angle of the robotic tool exceeds a threshold inclination angle and the robotic tool is moving onto the docking station.

5. The method according to claim 1, wherein the robotic tool system comprises one or more proximity sensors configured to obtain proximity data representative of a distance between the robotic tool and the docking station, and wherein the method comprises the step of:
    verifying that the robotic tool is positioned on or at the docking station using input from the one or more proximity sensors.

6. The method according to claim 1, wherein the robotic tool comprises an inclination sensor configured to sense the inclination angle of the robotic tool relative to a local gravitational field, and wherein the step of obtaining the inclination data comprises the step of:
    obtaining the inclination data from the inclination sensor.

7. The method according to claim 1, wherein the notification comprises the inclination angle of the robotic tool.

8. A computer program comprising instructions which, when the program is executed by a computer, cause the computer to carry out the method according to claim 1.

9. A computer-readable medium comprising instructions which, when executed by a computer, cause the computer to carry out the method according to claim 1.

10. A self-propelled robotic tool configured to operate an area in an autonomous manner, wherein the robotic tool comprises:
    one or more batteries being chargeable via a docking station,
    an inclination sensor configured to provide inclination data representative of an inclination angle of the robotic tool,
    an output unit, and
    a processor, and wherein the processor:
        verifies that the robotic tool is located on or at the docking station,
        obtains inclination data from the inclination sensor when the robotic tool is located on or at the docking station,
        causes an output of a notification via the output unit based on the inclination data,
        outputs a first type of notification responsive to the inclination data indicating that the inclination angle of the robotic tool exceeds a threshold inclination angle and the robotic tool is located on the docking station, and
        outputs a second type of notification, distinguishable from the first type of notification, responsive to the inclination data indicating that the inclination angle of the robotic tool exceeds a threshold inclination angle and the robotic tool is moving onto the docking station.

11. The robotic tool according to claim 10, wherein the robotic tool comprises one or more proximity sensors configured to obtain proximity data representative of a distance between the robotic tool and the docking station, and wherein the processor that verifies that the robotic tool is located on or at the docking station using input from the proximity sensors.

12. The robotic tool according to claim 11, wherein the one or more proximity sensors are configured to sense a magnetic field generated by the docking station.

13. The robotic tool according to claim 10, wherein the robotic tool is a self-propelled robotic lawnmower.

14. A robotic tool system comprising a self-propelled robotic tool and a docking station charging one or more batteries of the robotic tool, wherein the robotic tool is configured to operate an area in an autonomous manner and comprises an inclination sensor configured to provide inclination data representative of an inclination angle of the robotic tool, and wherein the robotic tool system comprises an output unit and a processor, the processor that:
    verifies that the robotic tool is located on or at the docking station,
    obtains inclination data from the inclination sensor when the robotic tool is located on or at the docking station,
    causes an output of a notification via the output unit based on the inclination data,
    obtains current inclination data representative of a current inclination angle of the robotic tool,
    compares the current inclination data with historic inclination data representative of one or more historic inclination angle/angles of the robotic tool, and outputs a notification based on a difference between the current inclination angle of the robotic tool and the one or more historic inclination angle/angles of the robotic tool.

15. The robotic tool system according to claim 14, wherein the docking station comprises one or more magnetic field generating units configured to generate a magnetic field, and wherein the robotic tool comprises one or more proximity sensors configured to sense a magnetic field, and wherein the processor verifies that the robotic tool is located on or at the docking station using input from the one or more proximity sensors.

16. The robotic tool system according to claim 14, wherein the output unit is a wireless communication unit that outputs the notification to an external device.

* * * * *